Jan. 14, 1941.   D. R. HEATH   2,228,955
MANIFOLD STRUCTURE
Filed Oct. 4, 1939
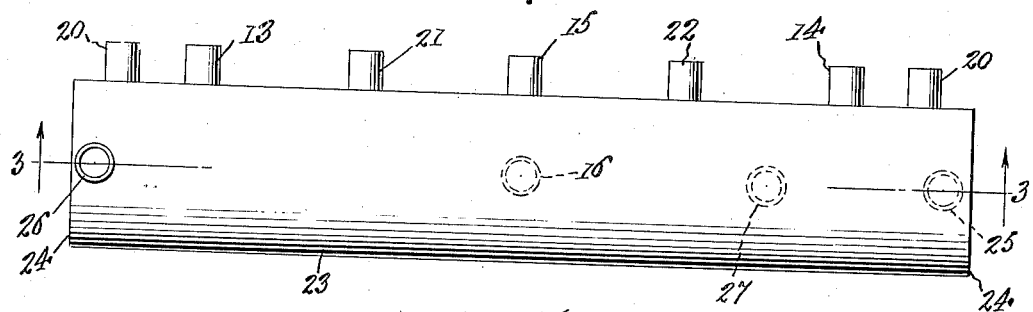
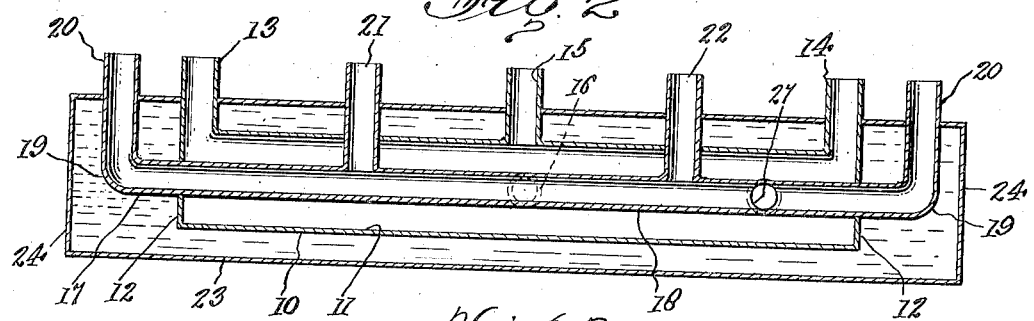
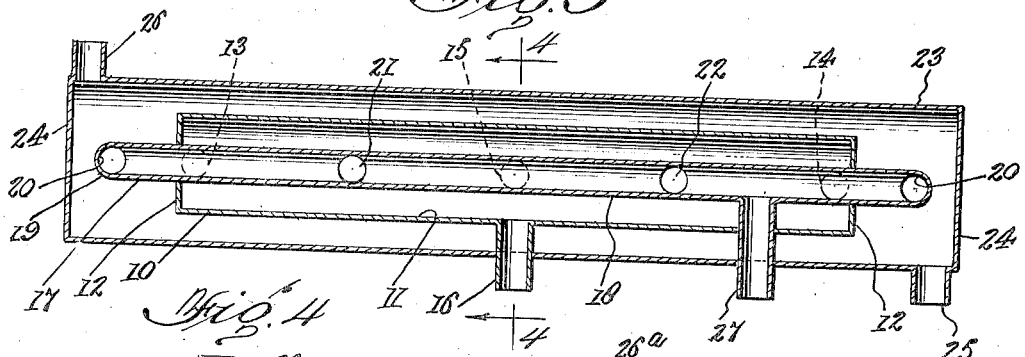
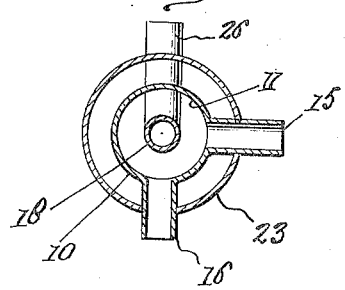
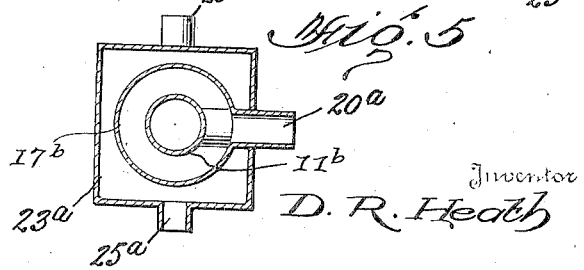
Inventor
D. R. Heath
By Wilkinson & Mawhinney
Attorneys Patented Jan. 14, 1941

2,228,955

UNITED STATES PATENT OFFICE 2,228,955

MANIFOLD STRUCTURE

Donald R. Heath, Riverside, Calif.

Application October 4, 1939, Serial No. 297,941

3 Claims. (Cl. 123—122)

This invention relates to manifold structures and more particularly to a combined intake and exhaust manifold for use in an internal combustion engine. An object of this invention is to provide an improved manifold structure for an internal combustion engine which is so constructed that the hot exhaust gases will form a heating medium for the intake manifold and also to provide a means whereby the exterior of the exhaust manifold may be maintained at the desired cool temperature.

Another object of this invention is to provide a combined intake and exhaust manifold structure which may be attached to the present construction of an internal combustion engine, wherein the manifold structure is adapted to be connected to the cooling system of the engine.

A further object of the invention is to provide a manifold structure which will eliminate any backfiring or burning of hot exhaust gases as is the case with exhaust mufflers and manifolds at present in use.

A still further object of this invention is to provide a manifold structure of this kind which is adapted to provide an even temperature for the incoming gases, so that a more smooth running of the engine will thereby be provided.

A still further object of this invention is to provide a structure of this kind which when placed on an internal combustion engine will permit of a more smooth running of the engine, thereby eliminating oil dilution, which is frequently caused by cold gases coming in contact with heated portions of the engine.

A further object of this invention is to provide a manifold of this kind which will permit a closer regulation of the fuel supply, thereby eliminating a considerable waste in fuel due to the setting of the fuel supply control means which at present is found to waste a considerable quantity of fuel at different engine temperatures.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a detailed top plan of a combined intake and exhaust manifold structure constructed according to an embodiment of this invention.

Figure 2 is a horizontal section taken longitudinally into the device.

Figure 3 is a sectional view taken on the line 3—3 of Fig. 1.

Figure 4 is a transverse section taken on the line 4—4 of the Fig. 3.

Figure 5 is a transverse section of a modified form of manifold structure.

Referring to the drawing, the numeral 10 designates generally an intake manifold which in the present instance is constructed in the form of an elongated cylindrical body 11 provided with end walls 12. The cylindrical body 11 is provided adjacent each end thereof with nipples 13 and 14, and at an intermediate point with an intermediate nipple 15. These nipples 13, 14 and 15 are adapted to be connected in any suitable manner to the intake ports of an internal combustion engine. In the present instance, there are three nipples connected to the manifold body 11, but it will be understood that the number of nipples used with the body 11 will depend upon the number of intake ports carried by the internal combustion engine. An intake nipple 16 is connected at one end to the manifold body 11 at substantially the longitudinal center thereof, and is adapted to be connected to a suitable carburetor throat. This manifold may use either single or multiple carburation.

An exhaust manifold, generally designated as 17, is disposed coaxial of the intake manifold body 11, and in the present instance the manifold 17 comprises an elongated tubular member 18 which has a diameter substantially less than the diameter of the manifold body 11. This tubular manifold member 18 extends through the end walls 12 of the intake manifold body 11, and is provided at each end thereof with an elbow 19 to which end nipples 20 are connected. If desired, the elbows 19 may be formed integrally with the nipples 20 and with the tubular member 18. A pair of intermediate nipples 21 and 22 are secured at the inner ends to the exhaust manifold member 18 on opposite sides of the intermediate nipple 15 of the intake manifold member 11. The nipples 21 and 22 are disposed in parallel relation with the nipples 13, 14 and 15, and extend through the body 11 substantially midway between the nipples 13 and 15, and 14 and 15, respectively.

An outer cooling or water jacket 23 is disposed about the intake manifold member 11 and is of such a length as to extend beyond the end nipples 20 of the exhaust manifold, so that the projecting portions of the tubular member 11 will extend within the interior of the cooling jacket 23, and the nipples 20 with the elbows 19 will also be disposed for at least a portion of their length in the jacket 23. The jacket 23 is provided with end walls 24 and with an intake nipple 25 disposed at one end of the jacket 23 and connected to the lower side thereof. An outlet nipple 26 is connected to the upper portion of the jacket 23 and is disposed adjacent the opposite end of the body 23. The exhaust manifold member 17 is provided with an outlet nipple 27 which extends through the jacket 23. This nipple 27 is adapted to be connected to an exhaust pipe or suitable carry-off means.

In Fig. 5 there is disclosed a slightly modified form of manifold structure wherein the jacket 23a is formed substantially square or rectangular in transverse section. In this construction the intake manifold 11b is disposed interiorly of the exhaust manifold 17b. An intake nipple 25a is connected to the lower wall of the jacket 23a adjacent one end thereof, and an outlet nipple 26a is connected to the top wall of the jacket 23a adjacent the opposite end thereof. The manifold shown in Fig. 5 also embodies nipples 20a and the remaining nipples shown in Fig. 2.

In the use of this manifold structure, the nipples 13, 14, and 15 are adapted to be connected to the exhaust ports of the internal combustion engine, and the nipples 20, 21 and 22 are adapted to be connected to the intake ports of the engine. The nipple 26 may be connected to one side of the water cooling system of the engine, and the nipple 25 may be connected to the other side of the cooling system, so as to insure circulation of water through the jacket 23. The nipple 27 is connected to a suitable carry-off means, and the nipple 16 may be connected to the carburetor or other source of fuel supply.

The hot exhaust gases will pass through the nipples 20, 21, and 22 into the cylindrical body 18, and within the intake member 11. The incoming fuel in the intake manifold member 11 will be heated through the exhaust gases heating the tubular member 18, thus raising the temperature of the incoming gases. The exhaust gases will then pass out through the nipple 27. The outer cooling jacket 23 will maintain the exhaust manifold member 17 at a substantially uniform temperature so that irrespective of the speed of the engine, the exhaust manifold 17 will be kept at the desired temperature, and at the same time the incoming fuel vapors will be raised in temperature to a point where they will more readily ignite in the cylinders of the engine. By extending the exhaust manifold through the center of the intake manifold and cooling the exterior of the intake manifold, the cooling of the intake manifold by the water in the jacket 23 will maintain a uniform temperature of the incoming fuel gases.

A manifold structure constructed according to this invention will provide a more even or smooth running of an internal combustion engine, will also effect an economy in the running of the engine, due to the fact that the carburetor of the engine can be more accurately adjusted, and this manifold may also be connected to the present structure of an internal combustion engine, particularly where the intake and exhaust ports are on one side of the engine.

It is of course understood that various changes and modifications may be made in the details in construction of the hereinbefore described embodiment of this invention, such changes and modifications being restricted only by the scope of the following claims.

What I claim is:

1. In combination, a combined intake and exhaust manifold for an internal combustion engine, comprising an outer cooling jacket, means for connecting the jacket to the cooling system of the engine, one of said manifolds disposed within said jacket and provided with connecting means to the engine, the other of said manifolds having a diameter substantially less than the diameter of the first mentioned manifold and completely housed within the first mentioned manifold, said last mentioned manifold also having connecting means to the engine, said latter means extending laterally through said jacket, and an outlet nipple connected to one of said manifolds and extending through the other said manifold and said jacket.

2. In combination, a combined intake and exhaust manifold for an internal combustion engine, comprising an outer cooling jacket, means for connecting the jacket to the cooling system of the engine, a cylindrical intake manifold within said jacket, a plurality of nipples connected to said manifold and adapted to be connected to the intake ports of the engine, an intake nipple connected to said manifold, a cylindrical exhaust manifold disposed completely within the intake manifold and having a diameter substantially less than the diameter of said intake manifold, means for connecting said intake manifold to the intake ports of the engine, said latter means extending laterally through said jacket, and an outlet nipple connected to said exhaust manifold and extending through said intake manifold and said jacket.

3. In combination, a combined intake and exhaust manifold for an internal combustion engine, comprising an outer rectangular cooling jacket, means for connecting the jacket to the cooling system of the engine, a cylindrical exhaust manifold within said jacket, a cylindrical intake manifold disposed concentrically of said exhaust manifold and having a diameter substantially less than the diameter of said exhaust manifold, means for connecting said intake manifold to the intake ports of the engine, and an outlet nipple connected to said exhaust manifold and extending through said intake manifold and said jacket.

DONALD R. HEATH.